Feb. 26, 1929.
F. KADE
1,703,533
COMPENSATED ASYNCHRONOUS MOTOR
Filed Jan. 29, 1925
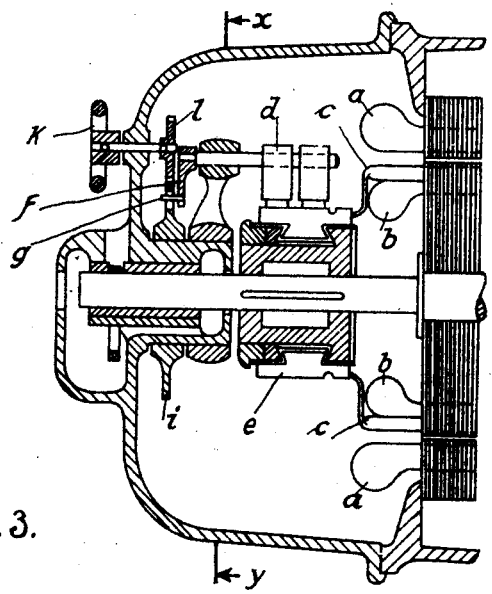
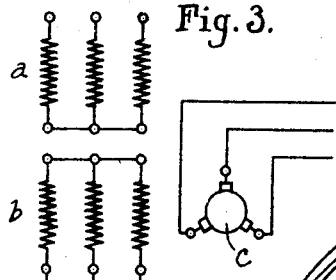
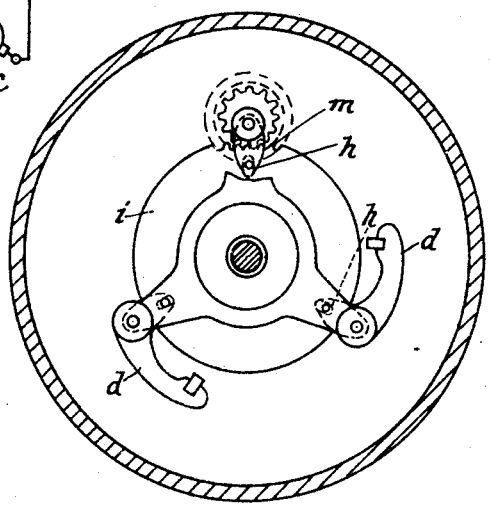
Inventor:
Friedrich Kade
By Chatwin & Company
attys.

Patented Feb. 26, 1929.

1,703,533

UNITED STATES PATENT OFFICE.

FRIEDRICH KADE, OF KIEL, GERMANY, ASSIGNOR, BY MESNE ASSIGNMENTS, TO DEUTSCHE WERKE KIEL AKTIENGESELLSCHAFT, OF KIEL, GERMANY, A CORPORATION OF GERMANY.

COMPENSATED ASYNCHRONOUS MOTOR.

Application filed January 29, 1925, Serial No. 5,584, and in Germany January 21, 1924.

The invention relates to a compensated asynchronous motor and consists essentially in that the brushes are lifted from the commutator during starting of the motor.

The conditions of commutation of a compensated asynchronous motor with stator windings connected to the mains are very favorable as soon as the speed of the motor is near synchronism. The slip of the secondary winding is very small with regard to the magnetic revolving field and therefore a very low, in fact a negligible transformer voltage is induced in the turns of the secondary winding which is short circuited by the brushes. During starting, however, the conditions are very unfavorable, the difference of speed of the revolving field and the motor winding being considerable. At this moment therefore a very high E. M. F. is generated in the short circuited turns.

The object of this invention is to make the design of the motor independent from the conditions of the starting. This is attained by lifting the commutator brushes during the starting of the motor. In this way the difficulty of commutation during the starting period is avoided, and in designing the motor, it is only necessary to pay attention to the running conditions, thereby enabling the exciter circuit to be wound for higher voltage and lower amperage of exciter current. In consequence thereof, the dimensions of the commutator may be diminished and therefrom results a decrease of the commutation-losses, both electrical and mechanical, the surface of the brushes bearing on the commutator becoming smaller. Thus the lifting of the brushes during starting proves very advantageously in comparison to the usual method of irremovable brushes.

One embodiment of the invention is illustrated by way of example by the accompanying drawing, in which:

Figure 1 shows in sectional elevation the portion of a compensated asynchronous motor provided with the brush lifting device, and Fig. 2 is a cross section on line $x$—$y$ of Fig. 1. Fig. 3 shows a diagram of the connections.

Referring first to Figure 3 of the drawings, showing the circuit connections of a motor of the type concerned with this invention, $a$ indicates the stator winding which is connected to the source of voltage supply. The working or load winding $b$ of the rotor is an ordinary three or multiphase winding electrically connected with slip rings. Besides this winding a normal commuted exciting winding $c$ is arranged on the rotor, being illustrated as lying within the commutator, and a suitable voltage is supplied thereto in known manner so that the current flowing therein normally effects compensation.

The starting is effected in the usual manner, but as the motor, according to the invention, is provided with liftable commutator brushes, these are lifted during the starting period, and are lowered upon the commutator so as to bring winding $c$ into operation to effect compensation only after the motor is running at speed. Thus the commutator does not have to be designed to cope with the heavy transformer voltage normally encountered in this kind of motor due to the large slip at starting, since it only has to deal with the much smaller voltages therein when the slip is small. A considerable economy in the manufacture of this kind of motor is thus effected, particularly in the design of the commutator and winding $c$.

Figures 1 and 2 show suitable means for carrying the invention into practical effect, from which it will be seen that for the purpose of lifting the brush holders $d$ from the commutator $e$ these are rotatably mounted and each connected with a crank arm $f$. The pins $g$ of these crank arms engage in elongated holes or slots $h$ of a disk $i$, which can be rotated with the help of a hand wheel $k$. For this purpose a pinion $l$ is mounted on the axle of said hand wheel, whilst the disk $i$ presents a toothed portion $m$ on a part of its circumference.

It is evident that by turning the hand wheel $k$, and thereby the disk $i$, the three crank arms $f$ and hence the brush holders $d$ connected therewith are simultanenously operated.

I claim:

1. A compensated asynchronous motor comprising a main stator winding, a secondary rotor winding in inductive relation thereto, adapted to carry the working or load current, an exciting winding on the rotor adapted to be energized over a commutator and brushes, and means for lifting said brushes from the commutator to render said exciting winding inoperative during starting of the motor, for the purpose set forth.

2. The combination of a compensated asynchronous motor having in its secondary part both an exciting winding fed over a commutator by means of brushes and a winding carrying the working or load current, with means for lifting said brushes from said commutator during starting of the motor, said brush-lifting means consisting of a hand wheel, a rotatably mounted slotted disk operatively connected with said hand wheel, crank arms rigidly connected with the brush holders, and pins on said arms engaged with the slots in said disk, substantially as and for the purpose set forth.

3. A non-synchronous alternating current motor, having working and exciting circuits on the secondary, frequency transforming means in circuit with the secondary exciting circuits and including a commutator and cooperating brushes normally held in contact with said commutator, and means for holding the brushes off the commutator at starting.

In testimony whereof I affix my signature.

FRIEDRICH KADE.